United States Patent [19]

Kobayashi et al.

[11] Patent Number: 5,033,590
[45] Date of Patent: Jul. 23, 1991

[54] BRAKE FRICTION PAD

[75] Inventors: Kinzo Kobayashi, Kanagawa; Shinichi Nakayama, Yamanashi, both of Japan

[73] Assignee: Tokico Ltd., Kawasaki, Japan

[21] Appl. No.: 496,197

[22] Filed: Mar. 19, 1990

[30] Foreign Application Priority Data

Mar. 20, 1989 [JP] Japan ............................. 1-31934[U]

[51] Int. Cl.$^5$ .................... F16D 66/00; F16D 65/04; F16D 69/00
[52] U.S. Cl. .................... 188/1.11; 188/73.1; 188/250 B
[58] Field of Search .................... 188/1.11, 73.1, 23, 188/242, 250 B, 250 G, 250 F, 253, 258; 192/30 W, 107 R; 206/508, 511, 509, 503, 520

[56] References Cited

U.S. PATENT DOCUMENTS

| 3,693,764 | 9/1972 | Anders | 188/73.1 |
| 3,998,300 | 12/1976 | Sullivan | 188/234 X |
| 4,124,105 | 11/1978 | Maehara | 188/1.11 |
| 4,811,860 | 3/1989 | Sorenson et al. | 206/508 X |

FOREIGN PATENT DOCUMENTS

| 0090134 | 7/1981 | Japan | 188/1.11 |
| 0266838 | 11/1986 | Japan | 188/73.1 |

Primary Examiner—Robert J. Oberleitner
Assistant Examiner—Josie A. Ballato
Attorney, Agent, or Firm—Wenderoth, Lind & Ponack

[57] ABSTRACT

A brake friction pad is provided with a recessed portion in one side of a backing plate and a riveting projection on the other side of the backing plate and a wear limit warning piece for a lining secured to the one side of the backing plate is riveted to the projection. The projection is formed with a plurality of steps. The wear limit warning piece is secured to the backing plate with an uppermost projecting portion of the projection fitted in a hole formed in the wear limit warning piece.

6 Claims, 4 Drawing Sheets

BRAKE FRICTION PAD

BACKGROUND OF THE INVENTION

1. Field of the Invention

The present invention relates to a brake friction pad for use in a disc brake mechanism or the like for braking an automobile, and, more particularly, to a brake friction pad having a wear warning piece for providing a warning of the wear limit of the lining of the brake friction pad.

2. Prior Art

FIGS. 1 and 2 show an example of a conventional brake friction pad.

Referring to FIGS. 1 and 2, reference numeral 1 designates a friction pad and 2 represents a backing plate of the friction pad 1. A pair of lugs 2A are so formed on the two sides of the backing plate 2 as to project laterally of the backing plate 2, the lugs 2A being adapted to be movably supported by a carrier (omitted from the illustration) of a disk brake. The backing plate 2 has circular punched holes 2B formed therein, the punched holes 2B acting to position a lining 5 to be secured to a side 2C of the backing plate 2.

Reference numeral 3 designates a circular recessed portion formed in the side 2C of the backing plate 2 at the lower left position of the backing plate 2 when viewed in the drawing, the recessed portion 3 being press-formed by using a punch (omitted from the illustration). Reference numeral 4 represents a projection to be riveted (shown after being riveted in the figure) formed on the other side 2D of the backing plate 2, the projection 4 being formed by using a die (omitted from the illustration) so positioned on the surface of the side 2D as to correspond to the position of the punch for forming the recessed portion 3. As a result, the projection 4 is formed by the die simultaneously with the forming of the recessed portion 3 by the punch.

Reference numeral 5 designates a lining secured to the side 2C of the backing plate 2, the lining 5 being made of a resin the base material which is a sintered metal or asbestos and which also fills the punched holes 2B and recessed portion 3. The lining 5 is pressed to a disc (omitted from the illustration) which rotates when the brake mechanism is operated so that it is moved into contact with the surface of the disc. As a result, a braking force is applied to the disc.

Reference numeral 6 designates a wear limit warning piece acting to notify a driver of the fact that the lining 5 has reached its wear limit. The wear limit warning piece 6 is manufactured by bending an elongated plate such as a steel plate having a spring effect by means of press forming or the like. A base portion 6A of the wear limit warning piece 6 is placed in contact with the side 2D of the backing plate 2 in such a manner that the projection 4 formed on the backing plate 2 is fitted in a hole 6B formed in the base portion 6A, and then riveted.

Assuming that the projection length of a front portion 6C of the wear limit warning piece 6 over the side 2C of the backing plate 2 in the thickness direction of the lining 5 is a, it is expressed by the following equation:

$$a = L_1 - L_2 - S \quad (1)$$

where $L_1$: the overall length of the wear limit warning piece 6

$L_2$: the length from the side 2D of the backing plate 2 to the top end of the wear limit warning piece 6

$S$: the thickness of the backing plate 2

As a result, when the above-described lining 5 has been worn down to its wear limit, the front portion 6C of the wear limit warning piece 6 is brought into contact with the surface of the disc rotating so that vibration causing a large amount of noise is generated. Thus, the fact that the lining 5 has reached its wear limit becomes obvious to a driver.

Another conventional technology will be described with reference to FIG. 3.

In general, there is a possibility of resonance being generated during operation of the braking mechanism due to a proximity or coincidence of the particular frequency of each of the braking mechanism parts, depending upon the dimensions of the parts such as the caliper, the friction pad and the disc. In order to prevent the above-described resonance or in order to change the thickness of the friction pad for other purposes, friction pad 1' has been employed which comprises a backing plate 2' having thickness S' which is smaller than the thickness S of the aforementioned conventional backing plate 2. If the friction pad 1' of the type just described above is assembled with the above-described wear limit warning piece 6 used as it is, the wear limit warning piece 6 projects in excess of a determined projection arranged to correspond to the wear limit thickness of the lining 5 by $\Delta S$ (where $\Delta S = S - S'$) which is the degree of the reduction in thickness when the backing plate 2' is designed.

In order to prevent this problem, a wear limit warning piece 6' having length $L_1'$ arranged to correspond to the thin backing plate 2' has been developed so as to be used in the thin type friction pad 1', the length $L_1'$ being expressed by the following equation:

$$L_1' = L_2' + S' + a = L_1 - \Delta S \quad (2)$$

However, the above-described friction pads 1 and 1' having the corresponding backing plate thickness S and S' must be provided with the correct corresponding wear limit warning pieces 6 and 6'. Therefore, there is a danger of erroneous provision of the wear limit warning piece 6 and the backing plate 2' or the wear limit warning piece 6' and the backing plate 2 in the manufacturing process. In order to prevent erroneous assembly of the parts described above, it is necessary to provide, for example, an identification mark or the like on each of the friction pads 1 and 1' and the wear limit warning pieces 6 and 6'. However, this results in an unwelcome increase in the number of administrative and assembly processes.

SUMMARY OF THE INVENTION

Accordingly, an object of the present invention is to provide a brake friction pad capable of overcoming the problem of erroneous assembly of wear limit warning pieces and thereby improving the working efficiency in assembly and administration work.

In order to achieve the above-described object, according to the present invention, there is provided a brake friction pad arranged in such a manner that a recessed portion is formed in a side of a backing plate so as to form a projection to be riveted on another side of the backing plate and a lining wear limit warning piece is riveted to the projection with the lining secured to the side of the backing plate on which the recessed portion is formed, the improvement comprising: forming the projection on the side of the backing plate on which the projection to be riveted is formed with a plurality of steps; fitting an uppermost projecting portion of the projection within a mounting hole formed in the wear limit warning piece; and securing the wear limit warning piece to the backing plate by riveting the uppermost projecting portion.

As a result of the above-described structure, even if the backing plates are arranged to have different thicknesses in order to prevent resonance thereof or to change the dimension for another purpose, the length of the projection of the wear limit warning piece secured to the projection can be maintained with respect to the position of the lining by forming the projection of each of the backing plates to have a plurality of steps so as to compensate for differences in the thickness of the associated backing plates. Therefore, a wear limit warning piece having the same shape can be commonly used for friction pads each having a different backing plate thickness.

Other and further objects, features and advantages of the invention will become apparent from the following description.

BRIEF DESCRIPTION OF THE DRAWINGS

FIG. 1 is a rear view of a friction pad, and FIG. 2 is a cross-sectional view taken along line 2—2 of FIG. 1;

FIG. 4 is a rear view which illustrates a friction pad according to the first embodiment, FIG. 5 is a cross-sectional view taken along line 5—5 of FIG. 4, FIG. 6 is an enlarged view of FIG. 5.

DESCRIPTION OF THE PREFERRED EMBODIMENTS

Figure 1:
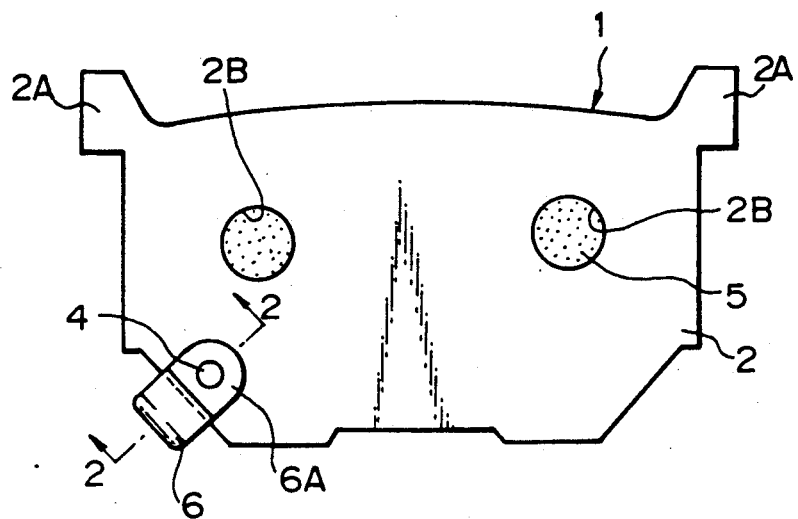
FIGS. 1 and 2 show conventional technology, where
Figure 2:
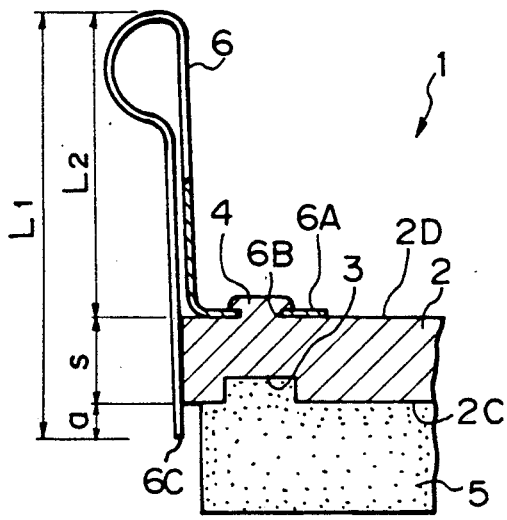
Figure 3:
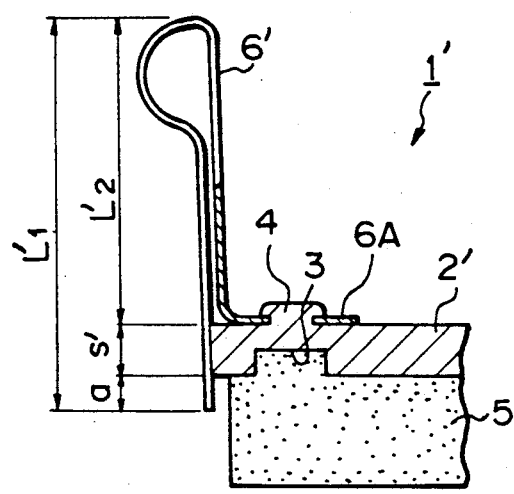
FIG. 3 is a cross-sectional view which illustrates an essential portion of another conventional technology.
Figure 4:
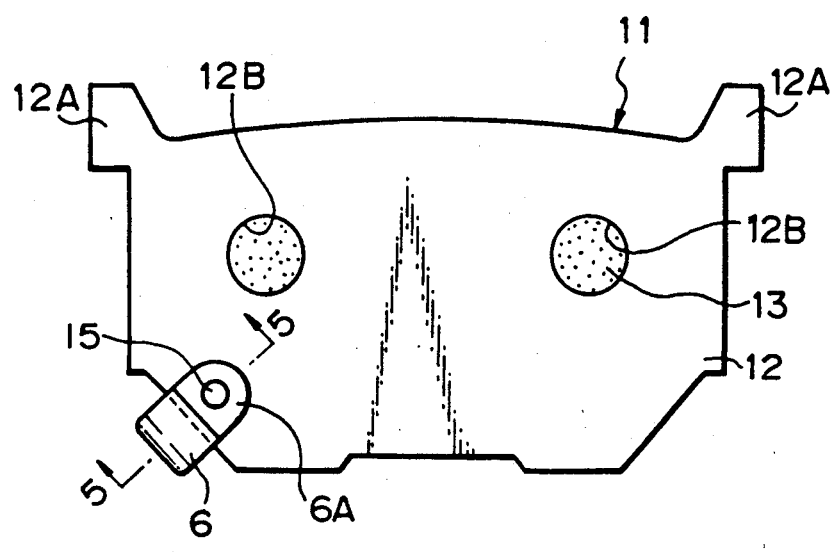
FIGS. 4 to 6 illustrates a first embodiment of the present invention, where
Figure 5:
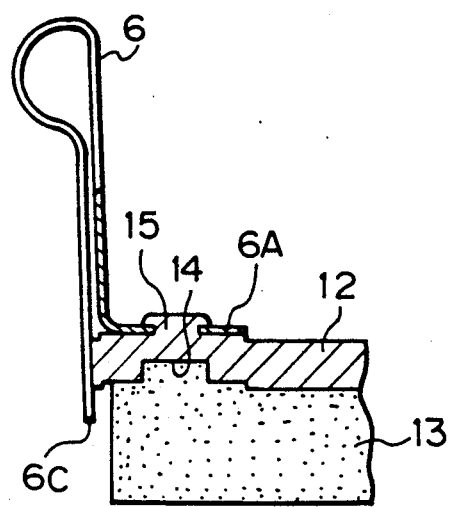
Figure 6:
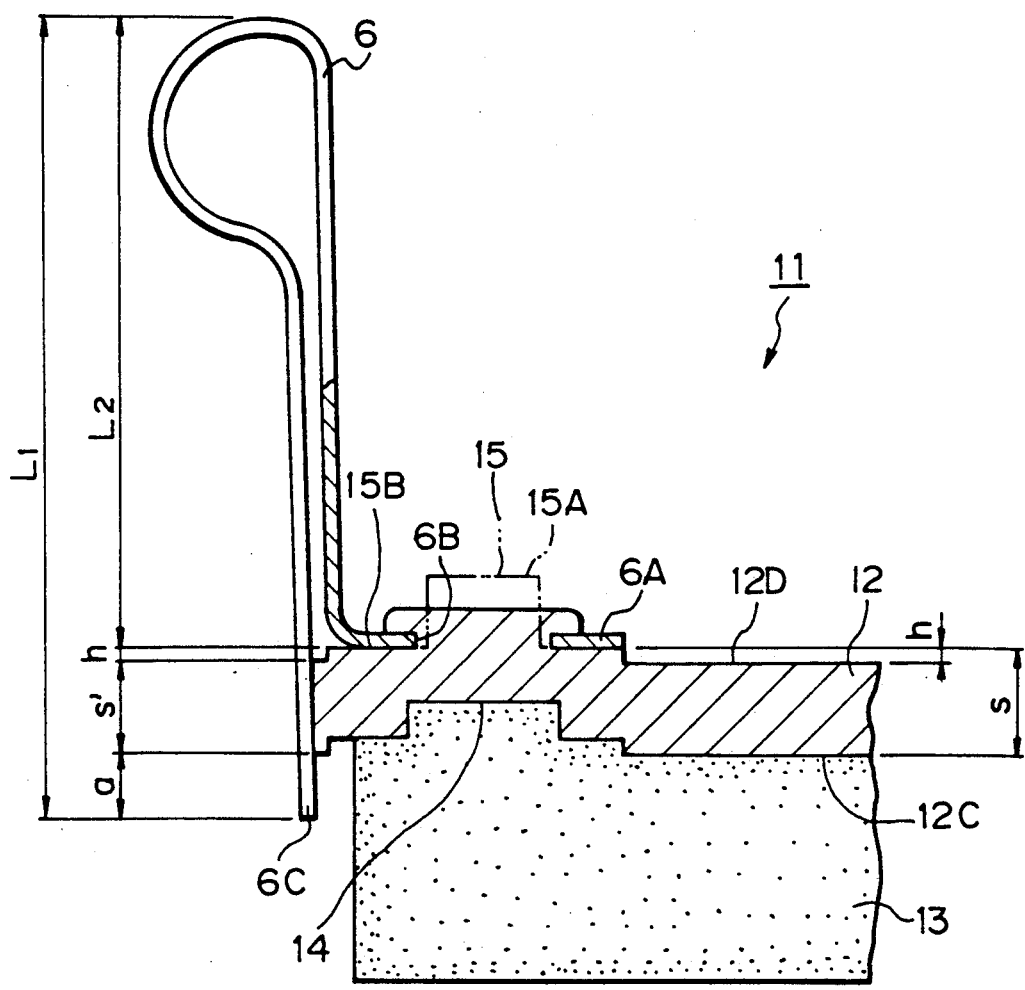

A first embodiment of the present invention will be described with reference to FIGS. 4 to 6.

Referring to the drawings, reference numeral 11 designates a friction pad according to the present embodiment, the friction pad 11 comprising, similarly to each of the conventional friction pads, a backing plate 12 and a lining 13 secured to a side surface 12C of the backing plate 12. According to this embodiment, a wear limit warning piece 6, having a similar shape to that of the first example of the conventional friction pad, is used. Although the backing plate 12 comprises a pair of lugs 12A and punched holes 12B, it is arranged to be a thin type having the above-described thickness S' which is similar to that of the backing plate 2' according to the second conventional friction pad. Reference numeral 14 designates a recessed portion formed in a side 12C of the backing plate 12, the recessed portion 14 being arranged to be in the form of a double-step shape formed by a punch (omitted from the illustration).

Reference numeral 15 designates a projection for supporting a base portion 6A of the wear limit warning piece 6, the projection 15 being formed on the other side 12D of the backing plate 12 by a die (omitted from the illustration) simultaneously with the forming of the recessed portion 14. The projection 15 is formed so as to be in a two-stepped shape comprising a projecting portion 15A (designated by alternate long and two short dashes line) and a projecting and stepped portion 15B for supporting the base portion of the projecting portion 15A.

The base portion 6A of the wear limit warning piece 6 is brought into contact with the top surface of the projecting and stepped portion 15B of the projection 15 with the projecting portion 15A fitted within a mounting hole 6B formed in the base portion 6A of the wear limit warning piece 6. Therefore, the base portion 6A is supported in such a manner that it is raised by height h from the other side 12D of the backing plate 12 as a result of riveting the projecting portion 15A as designated by the continuous line of FIG. 6, where the height h corresponds to the reduction $\Delta S$ (where $h = \Delta S = S - S'$) for preventing the resonance. As a result, a front portion 6C of the wear limit warning piece 6 is maintained at a predetermined projection length from the side 12C of the backing plate 12.

In the case where it is not necessary for the thickness of the backing plate to be arranged to prevent the resonance, the backing plate 2 having the thickness S according to the first conventional example is used. In this case, the projecting and stepped portion 15B is not formed and only the riveting projecting portion 15A is formed. Also in this case, the front portion 6C of the wear limit warning piece 6 is, similarly to the above-described structure, maintained at the same predetermined projection length "a" over the side 2C of the backing plate 2.

As a result of the above-described structure, the same shape wear limit warning piece 6 can be commonly used in both the usual friction pad 1 (according to the first conventional example) and the friction pad 11 whose backing plate 12 is arranged to have a reduced thickness and the necessity of preparing two types of wear limit warning pieces as in the conventional technology can be eliminated. Furthermore, the two types of the friction pads can be manufactured in the same assembly line, causing the number of manufacturing administration processes to be reduced. Therefore, working efficiency can be improved and manufacturing costs can be reduced. Even if the usual friction pad 1 and the friction pad 11 whose backing plate 12 has been arranged to have a reduced thickness are manufactured on the same manufacturing line, they can be readily identified by the existence of the projecting and stepped portion 15B.

Although the projection 15 is formed in the form of a two-stepped shape comprising the projecting portion 15A and the projecting and stepped portion 15B according to this embodiment, the present invention is not limited to this description. For example, the projection 15 may be arranged to be in the form of a three-stepped shape. In this case, the projecting portion is formed on the uppermost step of the projecting and stepped portion of the plurality of steps so that the base portion 6A of the wear limit warning piece 6 is placed on the uppermost projecting and stepped portion and is riveted to the projection portion. As a result, the height h from the side of the linear to the base portion 6A can be adjusted.

A second embodiment of the present invention will next be described.

Figure 7:
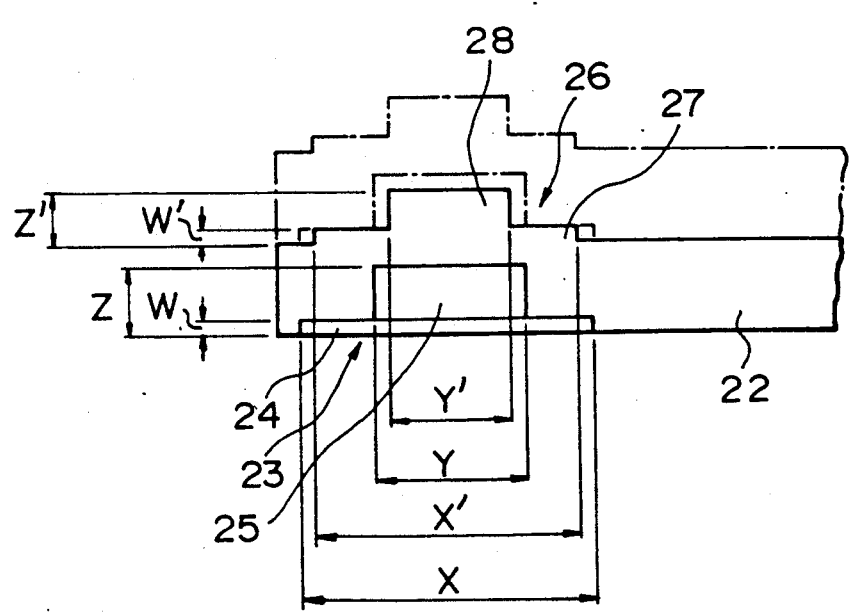
FIG. 7 is a partial cross-sectional view which illustrates a backing plate according to a second embodiment of the present invention.

This embodiment is structured in such a manner that a recessed portion 23 formed in a backing plate 22 and a projection 26 are formed with the following dimensional relationship established:

The diameter of a first recessed portion 24 of the recessed portion 23 is arranged to be larger than the outer diameter of a first stepped portion 27 of the projecting portion 26 ($X > X'$). The depth of the recessed portion 24 is arranged to be the same or larger than the height of the first stepped portion 27 ($W \geq W'$). Furthermore, the diameter of a second recessed portion 25 formed in the first recessed portion 24 of the recessed portion 23 is larger than the outer diameter of a second stepped portion 28 formed on the first stepped portion 27 ($Y > Y'$). The depth of the second recessed portion 25 is larger than the height of the second stepped portion 28 ($Z > Z'$). As a result of the above-described structure in which the recessed portion 24 and the projection 26 are formed as described above, the backing plates 22 can stably overlap each other as designated by an alternate long and short dash line of FIG. 7 with no gap formed therebetween. Therefore, the space for storing the backing plates 22 before the wear limit warning piece is secured to the backing plate 22 can be reduced. Furthermore, the handling of the backing plate 22 can be easily conducted at the time of its transportation.

As described above, according to the present invention, the structure is arranged in such a manner that a projection on one side of the backing plate is formed in a plurality of steps and the base portion of a wear limit warning piece is riveted to the uppermost projecting portion of the plural steps of the projection. As a result, the front end of the wear limit warning piece can be set at a predetermined position relative to the lining for both the usual friction pad and the friction pad whose backing plate is arranged to have a reduced thickness for preventing resonance or for changing the dimension of the pad for other purposes. Therefore, the same wear limit warning piece can be commonly used for friction pads each of which has a different thickness. Furthermore, the necessity of individually handling the friction pads and the wear limit warning pieces in the manufacturing process can be eliminated. As a result, the number of manufacturing and on administration processes can be reduced, resulting in an improvement in working efficiency and a reduction in overall costs.

Furthermore, even if a plurality of friction pads having different thickness are manufactured on the same manufacturing line, they can be readily identified by the existence of the projection of the plurality of the steps.

Although the invention has been described in its preferred form with a certain degree of particularly, it is understood that the present disclosure of the preferred form can be changed in the details of construction and another combination and arrangement of parts may be resorted to without departing from the spirit and the scope of the invention as hereinafter claimed.

What is claimed is:

1. A brake friction pad comprising:
   a backing plate having two opposite side surfaces defining a thickness therebetween;
   a lining secured to one side surface of said backing plate;
   a wear limit warning piece indicating that the lining has reached a predetermined wear limit, said wear limit warning piece being secured to the other side surface of said backing plate; and
   a projection on said other side surface of said backing plate in the form of a plurality of stepped portions, said plurality of stepped portions having an outermost projecting portion located most remotely from said backing plate and a secondary stepped portion having a projecting portion support surface facing away from said other side surface on which said uppermost projecting portion is located, said projection having a shape with the distance between said one side surface of said backing plate and the projecting portion support surface of the secondary stepped portion which is a first predetermined distance, and said wear limit warning piece having a base portion and an extending portion extending generally perpendicularly to said base portion and having a free end, said base portion having a hole therein in which said uppermost projecting portion of said projection is received, the free end of said extending portion extending beyond said base portion a second predetermined distance, said second predetermined distance being greater than said first predetermined distance by a third predetermined distance, said wear limit warning piece being secured to said other side surface of said backing plate with said base portion being placed on said projecting portion support surface of said secondary stepped portion and with the uppermost projecting portion extending through said hole in said base portion and being riveted thereover, whereby said wear limit warning piece can also be mounted flush on an other surface of a backing plate having a thickness corresponding to said first distance and project past the one surface of such a backing plate said third predetermined distance.

2. A brake friction pad according to claim 1, wherein said projection comprises a first stepped portion and a second stepped portion formed on said first stepped portion and having a diameter smaller than that of said first stepped portion.

3. A brake friction pad according to claim 2, wherein said one side surface has a recessed portion therein at a location corresponding to the location of said projection on said other side surface, said recessed portion comprises a first recessed portion and a second recessed portion formed in said first recessed portion and having a diameter smaller than that of said first recessed portion.

4. A brake friction pad according to claim 3, wherein the diameter of said first recessed portion is larger than the outer diameter of said first projection, the depth of said first recessed portion is at least the same as the height of said first projection, the diameter of said second recessed portion is larger then the outer diameter of said second projection and the depth of said second recessed portion is larger than the outer diameter of said second projection.

5. A brake friction pad according to claim 1, wherein said wear limit warning piece is an elongated plate, is riveted to said uppermost projecting portion at an end portion thereof, projects, by a predetermined length in the opposite direction to said lining with respect to said backing plate, is turned back at the predetermined length so as to extend toward said lining, and another end of which is positioned at a position which corresponds to a position of the wear limit thickness of said lining.

6. A brake friction pad as claimed in claim 1 wherein said wear limit warning piece is generally in the shape of a U, said base portion being at the end of one leg portion and bent generally perpendicularly to the one leg portion, and said extending portion comprising the other leg portion of the U.

* * * * *